US008002172B2

(12) United States Patent  (10) Patent No.: US 8,002,172 B2
Lager  (45) Date of Patent: Aug. 23, 2011

(54) PAPER COLLECTION SYSTEM AND DEVICE (76) Inventor: Bengt Lager, Marietta, GA (US)

( * ) Notice: Subject to any disclaimer, the term of this patent is extended or adjusted under 35 U.S.C. 154(b) by 465 days.

(21) Appl. No.: 12/116,306

(22) Filed: May 7, 2008

(65) Prior Publication Data

US 2009/0079306 A1  Mar. 26, 2009

Related U.S. Application Data (63) Continuation-in-part of application No. PCT/US2006/043193, filed on Nov. 7, 2006.

(60) Provisional application No. 60/734,328, filed on Nov. 7, 2005.

(51) Int. Cl.
A47G 29/12 (2006.01)

(52) U.S. Cl. ...... 232/43.2; 232/44; 312/211; 312/293.2; 220/495.08; 220/908.1

(58) Field of Classification Search .................. 232/43.2, 232/30–32, 45, 47, 51, 54, 36, 19, 44; 312/293.2, 312/211; 220/908.1, 495.08, 495.05
See application file for complete search history.

(56) References Cited

U.S. PATENT DOCUMENTS

| | | | |
|---|---|---|---|
| 378,955 A | 3/1888 | Dubey | |
| 1,451,343 A * | 4/1923 | Panagopolous | 232/30 |
| 2,531,444 A * | 11/1950 | Lane | 312/211 |
| 3,204,866 A * | 9/1965 | Brighton et al. | 232/43.2 |
| 3,314,632 A * | 4/1967 | Freuler | 248/101 |
| 3,793,756 A * | 2/1974 | Kay et al. | 40/306 |
| 3,802,620 A * | 4/1974 | Ferrara | 232/19 |
| 3,866,824 A * | 2/1975 | Lewis | 232/43.2 |
| 3,934,894 A | 1/1976 | Hoeffken et al. | |
| 3,935,994 A * | 2/1976 | Darvishian | 232/36 |
| 3,995,924 A * | 12/1976 | Jones | 312/211 |
| 4,084,495 A | 4/1978 | Paul | |
| 4,124,136 A | 11/1978 | Bjelland et al. | |
| 4,363,438 A | 12/1982 | Connor | |
| 4,404,775 A | 9/1983 | Demartini | |
| 4,523,641 A | 6/1985 | Manderscheid | |
| 4,756,445 A | 7/1988 | Agee, Sr. | |
| 4,775,069 A | 10/1988 | Stonier | |
| 4,801,042 A | 1/1989 | Hamada et al. | |
| 4,832,290 A | 5/1989 | Baglio | |
| 4,834,260 A | 5/1989 | Auten | |
| 4,856,953 A | 8/1989 | Lin | |
| 4,873,811 A * | 10/1989 | Izumitani et al. | 53/139.1 |
| 4,921,196 A | 5/1990 | Rudko | |
| 4,941,589 A | 7/1990 | Chen | |
| 5,004,195 A | 4/1991 | McIntyre | |
| 5,105,968 A * | 4/1992 | Fiterman et al. | 220/825 |
| 5,108,000 A | 4/1992 | Stoll et al. | |
| D327,793 S * | 7/1992 | McGrory | D6/448 |
| 5,137,212 A * | 8/1992 | Fiterman et al. | 232/43.2 |
| 5,176,315 A * | 1/1993 | Homel | 232/43.2 |
| 5,193,710 A | 3/1993 | Podd, Sr. et al. | |
| 5,201,575 A | 4/1993 | Stolzel | |

(Continued)

Primary Examiner — William L. Miller
(74) Attorney, Agent, or Firm — Innovative IP, PLC; Sandra M. Sovinski (57) ABSTRACT A shredding/recycling paper collection system and device, wherein a cabinet-style housing with a self-locking door is adapted with a paper guard member to prevent unauthorized reach-in access and assist with directional feed, and wherein the door-mounted paper guard member and the uniquely supported collection bag hangers facilitate easy authorized access to collection bag contents, while also providing secure positioning for weighty materials within the housing.

15 Claims, 8 Drawing Sheets

U.S. PATENT DOCUMENTS

| | | |
|---|---|---|
| 5,222,621 A | 6/1993 | Matias |
| 5,226,734 A | 7/1993 | Scott et al. |
| 5,238,356 A | 8/1993 | Salli |
| 5,261,553 A | 11/1993 | Mueller et al. |
| 5,375,781 A | 12/1994 | Schwelling |
| 5,421,476 A | 6/1995 | Matias |
| 5,435,484 A * | 7/1995 | Carlson .......................... 232/47 |
| 5,487,485 A | 1/1996 | Yang et al. |
| 5,494,161 A | 2/1996 | Herbst |
| 5,540,351 A * | 7/1996 | Luescher ................. 220/495.07 |
| 5,542,563 A | 8/1996 | Matias |
| 5,560,507 A | 10/1996 | Arpin et al. |
| 5,560,508 A | 10/1996 | Hsu |
| 5,626,254 A | 5/1997 | Podd et al. |
| 5,632,400 A | 5/1997 | Podd, Sr. et al. |
| 5,657,896 A | 8/1997 | Matias |
| 5,758,819 A * | 6/1998 | Sniegocki ..................... 232/4 D |
| 5,765,613 A | 6/1998 | Schrager |
| 5,775,649 A | 7/1998 | O'Leary |
| 5,803,300 A | 9/1998 | DeMars |
| 5,842,570 A | 12/1998 | Turnbull |
| 5,884,556 A * | 3/1999 | Klepacki et al. .............. 100/349 |
| 5,938,646 A * | 8/1999 | Carter .......................... 604/317 |
| 5,944,295 A | 8/1999 | McSherry |
| 6,131,866 A | 10/2000 | Kesinger |
| 6,202,884 B1 | 3/2001 | Verkerke |
| 6,241,115 B1 * | 6/2001 | Delmerico et al. ...... 220/495.06 |
| 6,250,488 B1 | 6/2001 | Narahara et al. |
| 6,488,241 B1 | 12/2002 | Kyte et al. |
| 6,533,137 B2 | 3/2003 | Gervais |
| 6,540,096 B1 | 4/2003 | Bazany et al. |
| 6,579,009 B1 | 6/2003 | Schinasi |
| 6,625,823 B1 | 9/2003 | Abbott |
| 6,637,609 B2 | 10/2003 | Stevens |
| 6,728,996 B2 | 5/2004 | Roscow |
| 6,837,391 B2 | 1/2005 | Mino |
| 7,318,548 B2 * | 1/2008 | Felice et al. .................... 232/45 |
| 7,624,915 B2 * | 12/2009 | Dembowiak et al. ........ 232/43.2 |
| 2003/0047561 A1 | 3/2003 | Neto |
| 2003/0197009 A1 | 10/2003 | Mino |
| 2004/0035864 A1 | 2/2004 | Mino |
| 2004/0217237 A1 | 11/2004 | McAllister |
| 2005/0005511 A1 | 1/2005 | Sacks |

* cited by examiner

PAPER COLLECTION SYSTEM AND DEVICE

PRIORITY CLAIM AND CROSS REFERENCE

The present U.S. non-provisional patent application is a Continuation-In-Part of, and claims priority to Patent Cooperation Treaty application, serial no. PCT/US2006/043193, filed on Nov. 7, 2006, entitled "Paper Collection System and Device," which claims the benefit of a U.S. Provisional application entitled "Paper Collection System and Device," filed Nov. 7, 2005, having assigned Ser. No. 60/734,328, wherein the present application claims all priority and benefit to the fullest extent permitted by law.

TECHNICAL FIELD

The present invention relates generally to paper collection devices and, more specifically, to a paper collection system and device for accumulating and securing waste paper, such as for subsequent shredding and/or recycling, wherein a cabinet-style housing with a self-locking door is adapted with a paper guard to prevent unauthorized "reach-in" access to sensitive papers, wherein the swing away door mount of the paper guard and uniquely supported collection bag hangers facilitate easy access to collection bag contents, and wherein the collection bag hangers provide secure positioning for weighty materials within the housing.

BACKGROUND OF THE INVENTION

Environmental consciousness has increased over time, with improved public education regarding limitations in natural resources, and with increased visibly of the potential and actual impact of unchecked global pollution. Such awareness has led to vast recycling efforts, especially for glass, certain plastics, and for paper. Many communities have embraced individual consumer recycling programs, thereby attempting to limit the amount of waste deposited in ever-growing landfills while also enabling the reclaiming of some items, thereby conserving resources, for example, saving trees by recycling paper. Other communities have turned to massive incinerators in order to reduce vast waste piles, formerly held to decompose on land. Either option, recycling or incinerating, is a viable alternative, but each typically requires at least some sorting of waste by consumers. As a result, trash sorting receptacles have been described, in order to facilitate the collection and disposal process, wherein, for example, paper is collected separately from other recyclable and non-recyclable refuse.

In addition to pollution and conservation, another recently widespread concern related to trash, and particularly to discarded papers, is that of identity theft. Such crimes often occur following the unauthorized examination of paper garbage bearing personal data and information. As a result, large percentages of homes are now equipped with personal shredders, wherein private papers are mutilated prior to placement into recycling or other garbage bins.

Certain businesses and operations, however, have long undertaken to maintain the privacy of information reflected on discarded papers. In particular, attorneys and physicians, both charged with maintaining confidentiality, must be particularly vigilant. Governmental and military facilities, too, must undertake special precautions to ensure the continued security of classified materials. In order to assist these professionals, and others, with the routine disposal of potentially large volumes of sensitive papers, professional shredding services have been designed, wherein sensitive papers are collected on-site, and removed by bonded service providers for shredding, recycling and/or incinerating. Such services allow quick disposal, even of important papers, by placement into a dedicated waste receptacle, whereby the need for the depositor to spend the time necessary to run the materials through an office shredder is eliminated. This convenience ensures and encourages proper disposal of confidential papers, irrespective of volume.

However, security of the discarded papers within such a collection container can be a relevant concern. As such, locks have been designed; however, in view of the present invention, each is disadvantageous. That is, keyed locks are routinely utilized, wherein only authorized individuals possess the ability to open the lock, such as during collection of the bulk paper materials. Unfortunately, in order for the collection bin to be re-secured following access, such locks must be proactively re-engaged. Thus, if an individual should be interrupted during the process, or should otherwise forget, a traditional paper collection cabinet would remain unlocked, and thus unprotected.

Moreover, whether locked or unlocked, the possibility of unauthorized "reach-in" access may remain. Some presently available collection receptacles incorporate a cross bar to prevent an individual from being able to reach therein. However, because such bars are fixed within the cabinet in a position intended to block access to the waste receptacle therein, they disadvantageously continue to inhibit free access to the receptacle during the emptying process.

Further, with respect to the collection bag, the weight thereof from the collected paper can cause failure of the bag mounts, wherein repeated bag transfer, with potential pulling by the authorized collector, can result in weakening or bending of a traditional hook or hanging rod, or can result in a disadvantageous expansion of its mounting aperture.

Therefore, it is readily apparent that there is a need for a shredding/recycling paper collection system and device, wherein a self-locking door safely protects contents while facilitating authorized access, wherein a door-mounted paper guard prevent unauthorized access to collected papers, without inhibiting access for emptying, and wherein a unique bag mounting system soundly supports the collection bag, yet facilitates safe and easy access to and replacement thereof, thus preventing the above-discussed disadvantages.

BRIEF SUMMARY OF THE INVENTION

Briefly described, in the preferred embodiment, the present invention overcomes the above-mentioned disadvantages and meets the recognized need for such a device by providing a paper collection system and device for receiving and securing waste papers for subsequent shredding, recycling, or the like, wherein a cabinet-style housing with a self-locking door is adapted with a paper guard member to prevent unauthorized reach-in access, without inhibiting authorized access to collection bag contents, and wherein uniquely supported collection bag hangers also facilitate easy access to collection bag contents, while also providing secure positioning for weighty materials within the housing.

According to its major aspects and broadly stated, the present invention is a generally rectangular cabinet with a flexible collection vessel removably positioned therein, wherein the collection vessel is held in position via a system of reinforced support components, wherein access to the cabinet is continuously and automatically limited via a self-locking closure mechanism and a door-mounted structural access guard.

More specifically, the present invention is a paper collection system and device, wherein a generally rectangular cabinet includes a hinged front access panel with a self-locking mechanism to prevent unauthorized access to sensitive paper documents prior to destruction of same. The self-locking mechanism necessitates use of a key, or other type of controlled access mechanism, in order to open the cabinet door. Subsequently, however, the lock remains in a ready state after opening. That is, reengagement of the lock via the key is unnecessary to secure the cabinet, because closure of the door automatically reactivates the lock, consistently preventing reopening of the cabinet in the absence of the key.

The cabinet door also includes a deposit way, in the form of a generally rectangular-shaped opening proximate the upper edge of the door, through which documents and other papers are deposited for collection. A document, or paper guard for inhibiting reach-in access into the collection compartment is provided on the interior surface of the cabinet door, just below the deposit way, wherein the surface of the document guard is angled down and out, extending partially over a removable paper collection vessel.

The collection vessel is a reusable bag, generally defining an elongated parallelepiped shape in order to adaptively fit and fill the cabinet. The bag includes hanger ports, opposingly positioned in pairs, proximate the upper edge of the bag, and handles extending from the base in order to facilitate removal from the cabinet when full.

Preferably, the interior sidewalls of the cabinet are adapted to support the bag via the hanger ports, wherein specialized support hooks are mounted inside the cabinet walls. The hooks are operatively designed to effectively support the heavy weight of a collection bag full of discarded paper, wherein placement of the hook mount is positioned to enable the transfer of a portion of the force from the weight of the bag away from the hook to the cabinet itself, transferring the force generated by the momentum of the weight toward the cabinet wall, thereby avoiding undesirable bending or failure of the hook. Via a fulcrum-like action, the downward gravitational pull of the bag contents coincidentally serves to further insert the hook mount into the cabinet wall, unlike previously described mounts. Another support mechanism is alternately envisioned, wherein the reusable collection bag is adapted with male bracket members and is slidably hung thereby via rails or troughs mounted or otherwise defined within the cabinet interior.

The base corners of the exterior cabinet are fitted with a cover that provides protection from damage, and that functions as a floor glide to ease in repositioning of the device. Further, each side of the cabinet is equipped with a handle to further facilitate ease of cabinet movement. Where the handle is formed as an aperture through the cabinet, a shield is provided therewith in order to ensure security of the cabinet contents against unauthorized reach-in access.

Therefore, a feature and advantage of the present invention is the ability of such a system and device to facilitate and encourage the collection of waste paper, for shredding, recycling, or other disposal.

Another feature and advantage of the present invention is the ability of such a system and device to direct paper feed.

Another feature and advantage of the present invention is the ability of such a system and device to prevent unauthorized reach-in access via a protective document guard, yet to also facilitate authorized access to collection bag contents by mounting the guard in a swing-away manner to enable entirely unimpeded retrieval of the collection bag.

Yet another feature and advantage of the present invention is the ability of such a system and device to provide secure positioning for weighty materials within a protected housing.

Still another feature and advantage of the present invention is the ability of such a system and device to maintain the privacy of information reflected on discarded papers.

Still yet another feature and advantage of the present invention is the ability of such a system and device to ensure and encourage proper disposal of confidential papers, essentially irrespective of volume.

Still another feature and advantage of the present invention is the ability of such a system and device to self-lock, thereby safely protecting contents while facilitating authorized access.

Yet still another feature and advantage of the present invention is the ability of such a system and device to inhibit unauthorized reach-in access, thereby safely protecting contents while facilitating authorized access.

Yet still another feature and advantage of the present invention is the ability of such a system and device to continuously and automatically limit access to contents.

Even still another feature and advantage of the present invention is the ability of such a system and device to prevent damage to exposed corners by effectively shielding same.

Yet further still another feature and advantage of the present invention is the ability of such a system and device to enhance ease of movement by incorporating handles for enabling grasping of the cabinet, and by incorporating floor glides for enabling slidable movement of the cabinet.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-4, 10A-10C, the present invention in the preferred embodiment is paper collection system and device 10, comprising cabinet-style housing 20 with preferably self-locking door 30, document guard 50 to assist with security of paper contents, and collection bag hangers 70 to facilitate easy access to contents of collection bag 100 and to provide secure positioning for weighty materials within housing 20. One skilled in the art would readily recognize that although the word document is conveniently utilized throughout to reference the paper disposed of within paper collection system and device 10, any type of paper or similar waste could be similarly deposited.

Figure 1:
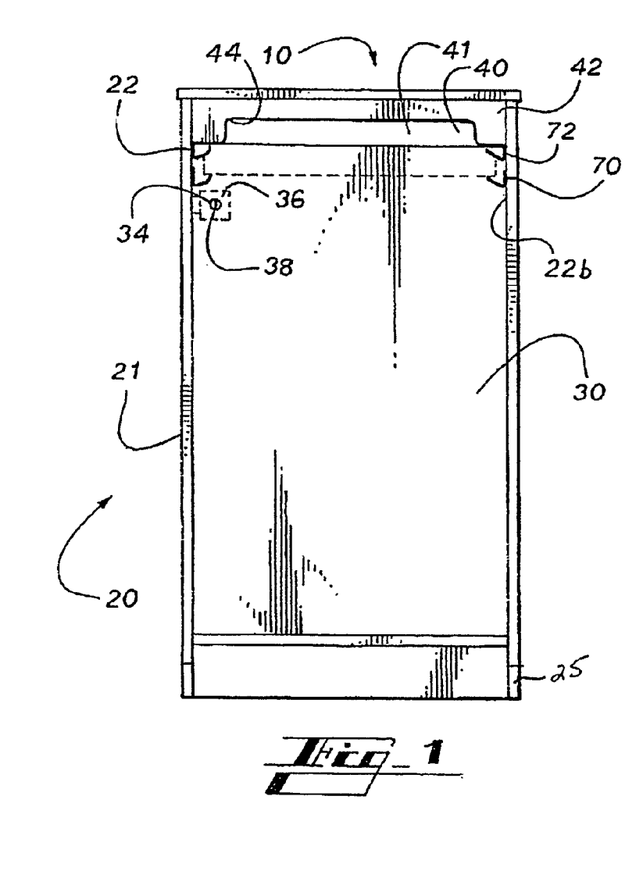
FIG. 1 is a front view of a paper collection cabinet, according to the preferred embodiment of the present invention, showing features via a transparent cabinet view.
Figure 2:
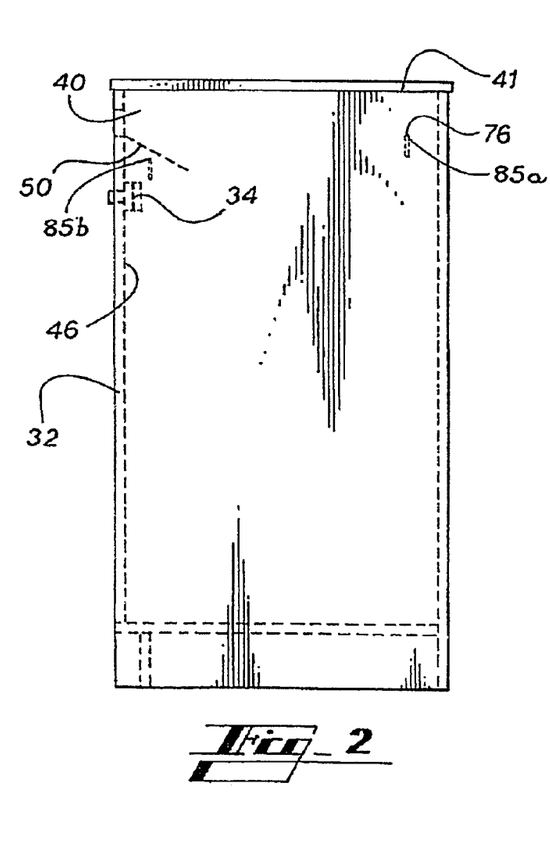
FIG. 2 is a side view of the paper collection cabinet of FIG. 1.
Figure 3:
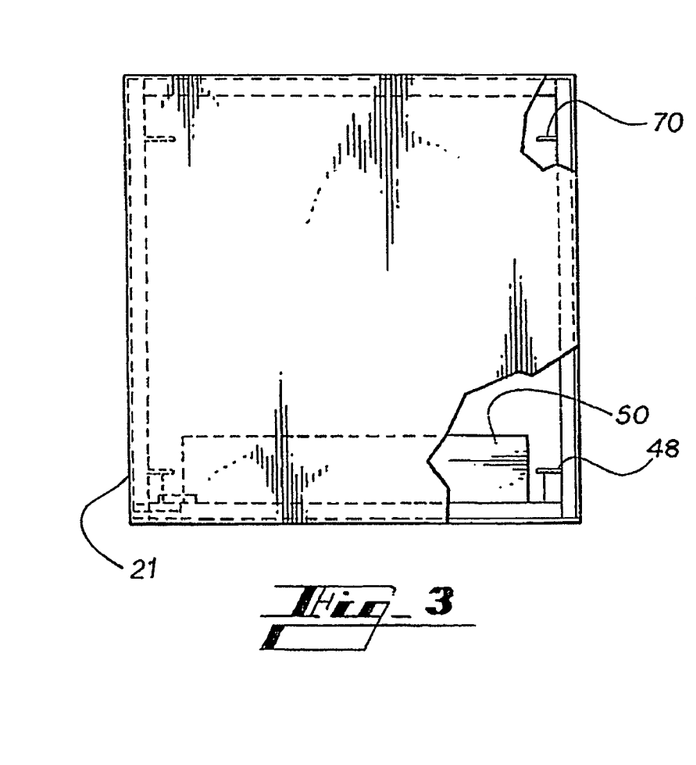
FIG. 3 is an overhead view of the paper collection cabinet of FIG. 1.

Preferably, cabinet-style housing 20 is generally rectangular, with hinged front access panel 32, preferably self-locking door 30, wherein preferred self-locking mechanism 34 prevents unauthorized access to sensitive paper documents prior to destruction of same. Front access panel 32 is preferably hingedly secured via piano hinges 48, wherein the preferred hinges 48 inhibit unauthorized removal of front access panel 32 from cabinet-style housing 20. One skilled in the art could employ other suitable hinges, however, piano hinges 48 are preferred.

Figures 8, 9:
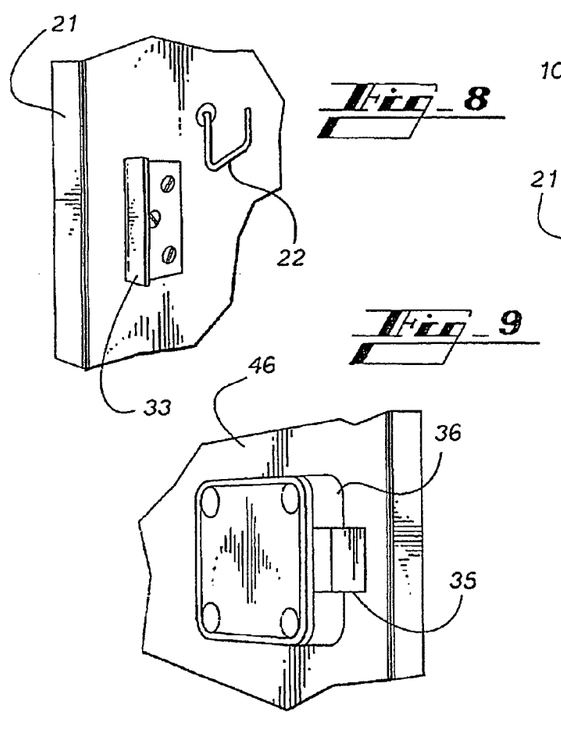
FIG. 8 is a photo of a partial perspective view of a side wall of the paper collection cabinet of the present invention, according to the preferred embodiment, showing the lock strike plate and a hook member.
FIG. 9 is a photo of a partial perspective view of the door of the paper collection cabinet of the present invention, according to the preferred embodiment, showing the spring bolt rim lock and a portion of the paper guard.
Figure 10A:
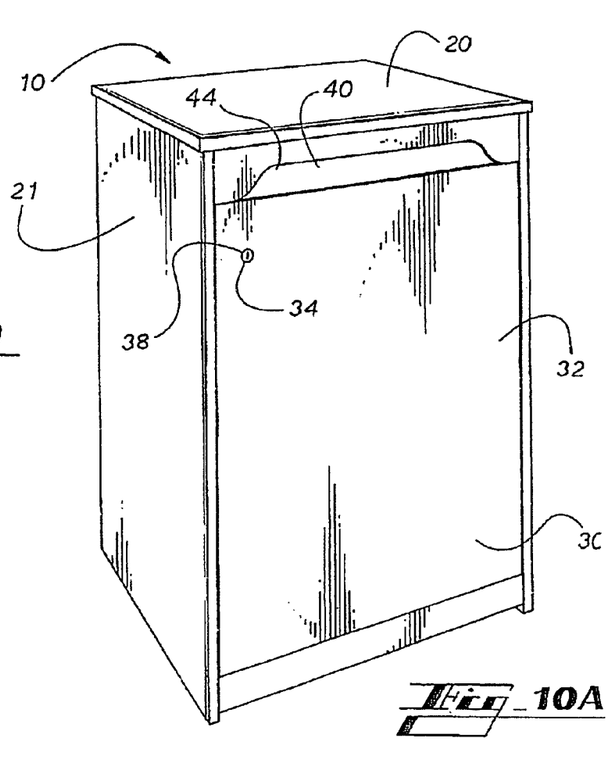
FIG. 10A is a photo of a perspective view of a paper collection cabinet, according to the preferred embodiment of the present invention.

Referring now to FIGS. 8-9, and 10A, preferably, self-locking mechanism 34 is spring bolt rim lock 36, configured to require use of a key via keyhole 38 in order to open door 30. Preferably, spring bolt rim lock 36 remains in a ready state after opening via keyhole 38, wherein subsequent closure of door 30 secures closure of cabinet 20, preferably automatically reactivating self-locking mechanism 34. Preferably, strikeplate 33 is securely mounted to cabinet sidewall 21 such that latchbolt 35 engages therewith upon closure of door 30, preventing subsequent opening thereof without use of a key.

Although spring bolt rim lock 36 is preferred, other types of self-locking mechanisms 34 could be utilized in order to accomplish the desired feature of consistently preventing reopening of the cabinet in the absence of the key by eliminate the need for proactive locking following authorized access. Further, although keyhole 38 is preferred for controlling access via a key, other types of access controls could be utilized, such as a mechanical and/or electronic keypad or remote. Further, cabinet 30 could also and/or alternately include an alarm mechanism to indicate a reminder signal to an authorized user that hinged panel 30 remains unsecured. In such case, hinged panel 30 could be adapted to require proactive locking following authorized access thereto.

Cabinet housing 20 is preferably adapted with plurality of corner guards 25, whereby protection from inadvertent damage to cabinet corners is provided, and whereby slidable movement of cabinet housing 20 across a surface is facilitated. In the preferred embodiment, each corner guard 25 is a molded synthetic member that is dimensioned to essentially surround each base corner of cabinet housing 20. Of course, any suitable material or shape could be utilized for corner guards 26, wherein the preferred functionality may be supported, including protective qualities as well as slidable qualities. Further, it is preferred that each corner guard 25 is fastened to cabinet housing 20 with a threaded fastener, or the like; however, it should be recognized that adhesive attachment and/or even integral formation with the exterior surface of the cabinet could also be a possibility.

Figure 10B:
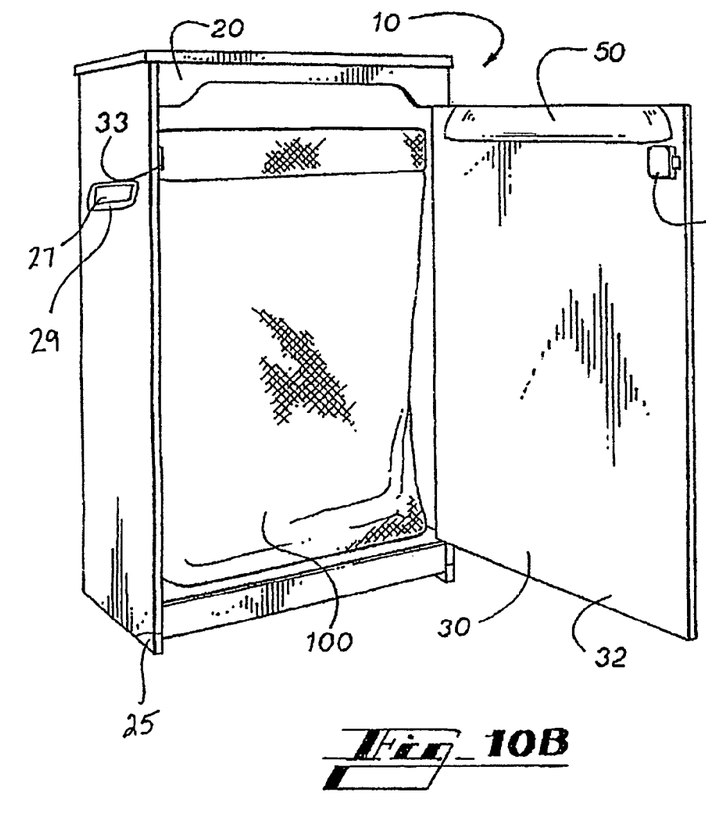
FIG. 10B is a photo of a perspective view of the paper collection cabinet of FIG. 10A, showing the door in an open position and showing a collection bag installed therein.
Figure 10C:
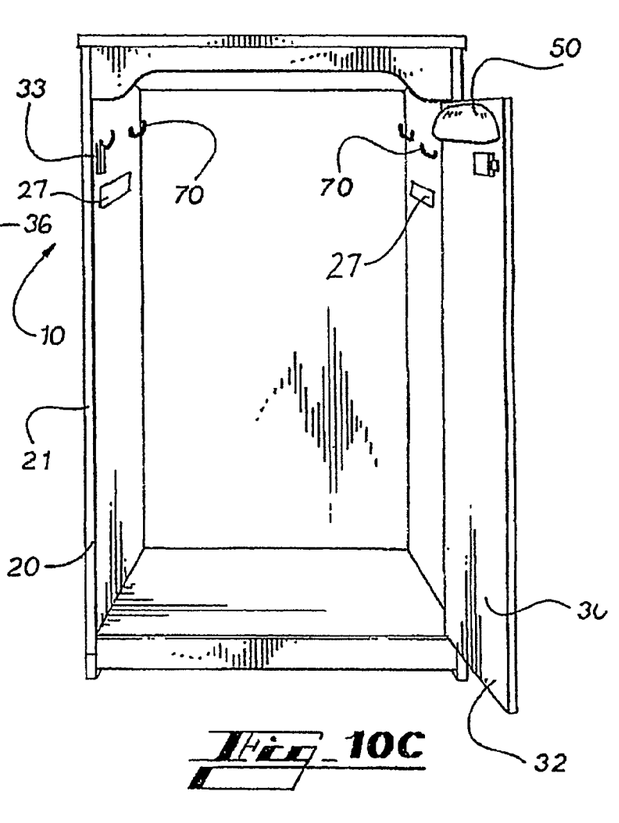
FIG. 10C is a photo of a perspective view of the paper collection cabinet of FIG. 10A, showing the door in an open position.

Handles 27, representatively depicted in FIGS. 10B-10C, further assist in slidable movement for repositioning of paper collection system and device 10. Preferably, each handle 27 is defined through each respective sidewall 21, generally as a rectangular-shaped aperture. Frame 29 is preferably installed within and generally surrounding the handle aperture in order to enhance aesthetics and to provide a comfortable gripping surface during cabinet movement. Preferably, each handle 27 includes a shield component that functions to prevent reach-through access to the interior of cabinet 20. In one embodiment, the shield component may be integral with handle 27, wherein no actual aperture remains defined between the interior and the exterior of cabinet 20 relative to handle 27, but in such an embodiment, handle 27 would essentially be solid, with an inner-cabinet disposed finger-access region. One skilled in the art should recognize that other handle variations could be provided without departing from the intended scope of the present invention. That is, although handle 27 is preferred as described, handles that are exterior mount style could alternately be utilized and installed on exterior surfaces of cabinet 20. Further, cabinet 20 could be manufactured and utilized without incorporation of handles 27 or any other handle.

Preferably, door 30 includes deposit way 40, preferably generally rectangular-shaped opening 41 proximate upper edge 42 of door 30, preferably defined with generally rounded interior corners 44 through which documents and other papers are safely deposited for collection. Preferably, document guard 50 is provided proximate deposit way 40 for facilitating proper directional feeding of papers into collection bag 100, wherein document guard 50 is preferably affixed on interior surface 46 of cabinet door 30, just below deposit way 40.

Referring now to FIGS. 6A-6D, document guard 50 preferably defines a generally triangular profile, wherein upper surface 52 is preferably angled down from attachment wall 54 to end wall 56, and wherein upper surface 52 is preferably smooth, thereby facilitating movement of papers there along, exiting into collection bag 100 proximate end wall 56, while functionally blocking reach-in access, via deposit way 40, into collection bag 100. Preferably, document guard 50 is formed from plastic, as an injection or blow-molded integrally formed unit, with plurality of attachmentways 58 provided to facilitate secure attachment of document guard 50 to door 30. Preferably, plurality of attachmentways 58 includes upper edge fastening ports 60 and side edge fastening ports 62, wherein each port 60, 62, is preferably dimensioned to facilitate passage of a threaded fastener, screw or other attachment device therethrough, and to provided access for installation of same, via a screwdriver, hex key, or other suitable tool. One skilled in the art would readily recognize that other arrangements, other supportive fasteners, and/or other types of attachmentways could be utilized to support document guard 50 on door 30. The unique door-mounted installation of document guard 50 facilitates unimpeded access to collection bag 100 for emptying, as depicted in FIG. 10B, wherein document guard 50 swings away from cabinet 20 upon opening of door 30.

Figure 4:
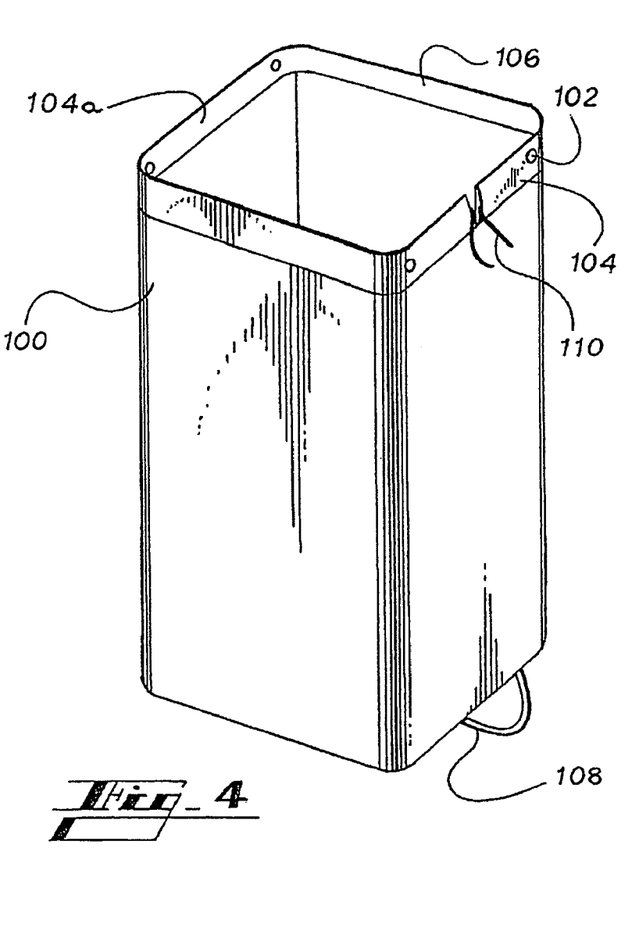
FIG. 4 is a perspective view of a collection bag, according to the preferred embodiment of the present invention.

Referring now to FIG. 4, preferably, collection bag 100 is flexible and reusable, generally defining an elongated parallelepiped shape, adapted fit and fill cabinet housing 20. Preferably, bag 100 includes plurality of hanger ports 102, preferably opposingly positioned on sidewalls 104a and 104b, proximate preferably reinforced upper edge 106 of bag 100. In the preferred embodiment, collection bag 100 is nylon, or other suitable material capable of supporting heavy loads and frequent handling. Base handles 108 are preferably provided to facilitate removal of bag 100 from cabinet housing 20, and, also preferably, drawstring 110 is provided proximate reinforced upper edge 106, in order to enable closure during movement or transport of bag 100, if desired.

Referring now to FIGS. 1, 5A, 8 and 10C, plurality of collection bag hangers 70 preferably provide secure positioning for collection bag 100 within cabinet housing 20. Preferred support hanger 72 preferably defines a U-type shape via angled base 73, outer extension arm 74 and rear support arm 75. Preferably, support hanger 72 further includes attachment head 76 adapted for snug locking within a mount aperture (not shown), preferably defined within interior sidewalls 22a and 22b of cabinet housing 20. The preferred, specialized U-type, angled base shape of support hanger 72 is operatively designed to effectively support the heavy weight of collection bag 100, when full of discarded paper, wherein forces delivered via hanger port 102 of collection bag 100, proximate angled base 73, are effectively transferred to rear support arm 75, and ultimately preferably partially borne by inner sidewalls 22a and 22b via said transfer. Such transfer of force minimizes pulling strain, thereby avoiding bending of support hanger 72, and further, the unique design of rear support arm 75, in concert with the preferred U-type, angled base shape support of support hanger 72 inhibits downward and/or outward movement of attachment head 76 from hanger port 102, by transferring a portion of the force from the weight of bag 100 away from support hanger 72 to cabinet 20 itself, transferring the force generated by the momentum of the weight toward the cabinet wall, thereby avoiding undesirable failure of the support hanger 72.

Figure 5A:
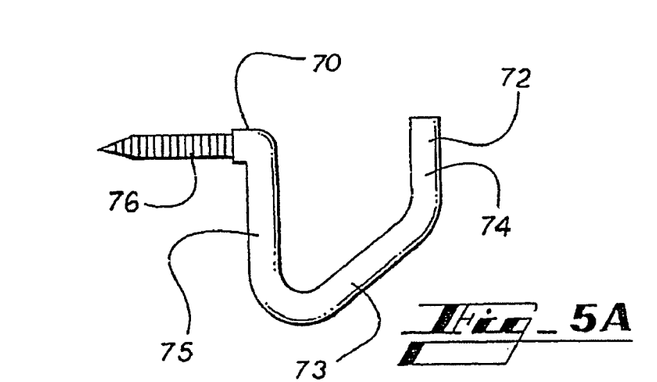
FIG. 5A is a side-view of a hook member, according to the preferred embodiment of the present invention.
Figure 5B:
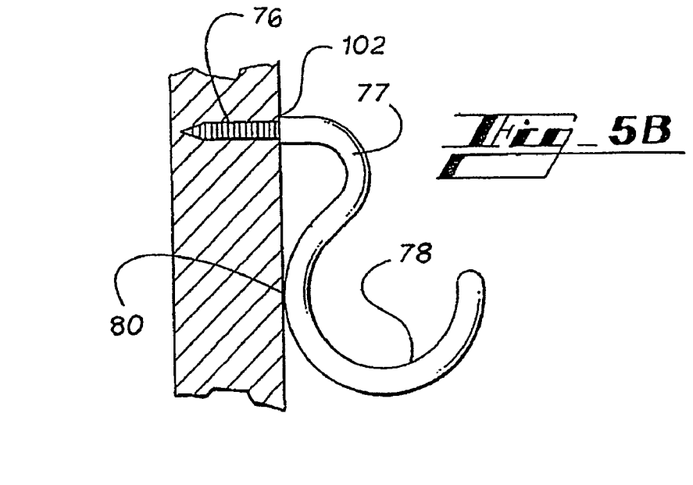
FIG. 5B is a side-view of a hook member, according to an alternate embodiment of the present invention, showing the hook installed through a cabinet wall.

Similarly, yet alternately, plurality of collection bag hangers 70 could be configured as depicted in FIG. 5B, wherein support hanger 77 could define an S-type shape within mount aperture 76. The specialized S-type shape of support hanger 77 is operatively designed to effectively support the heavy weight of collection bag 100, when full of discarded paper, wherein forces delivered via hanger port 102 of collection bag 100, proximate support base 78, are partially borne by inner sidewalls 22a and 22b via transfer at support arc 80. Such transfer of force minimizes pulling strain at attachment head 76 of support hanger 77, and further, the unique shape of support arc 80 inhibits downward and/or outward movement of attachment head 76 from hanger port 102.

Figure 5C:
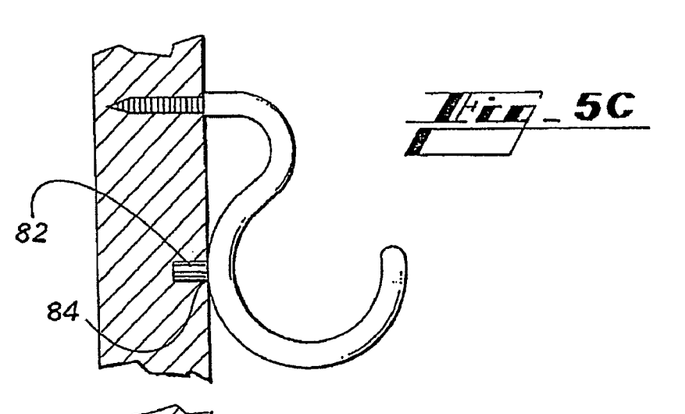
FIG. 5C is a side-view of a hook member, according to an alternate embodiment of the present invention, showing the hook installed through a cabinet wall.
Figure 5D:
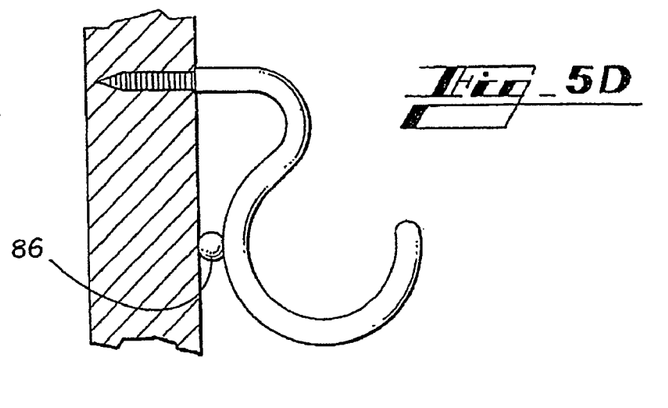
FIG. 5D is a side-view of a hook member, according to an alternate embodiment of the present invention, showing the hook installed through a cabinet wall.

Also alternately, plurality of collection bag hangers 70 could be configured as depicted in FIG. 5C, wherein attachment base 82 could extend from support arc 80. Inner sidewalls 22a and 22b of cabinet housing 20 could be adapted with receiving ports 84 therefore, thereby further transferring pulling forces from collection bag 100 to cabinet housing 20, and further inhibiting and/or preventing downward and/or outward movement of attachment head 74 from hanger port 102. Also similarly, yet again alternately, plurality of collection bag hangers 70 could be configured as depicted in FIG. 5D, wherein reinforcement member 86 could extend from support arc 80, providing additional strength at the force transfer/bearing point along support arc 80. One skilled in the art would readily recognize that reinforcement member 86 and/or attachment base 82 could extend from preferred U-shaped support hanger 70.

Figure 5E:
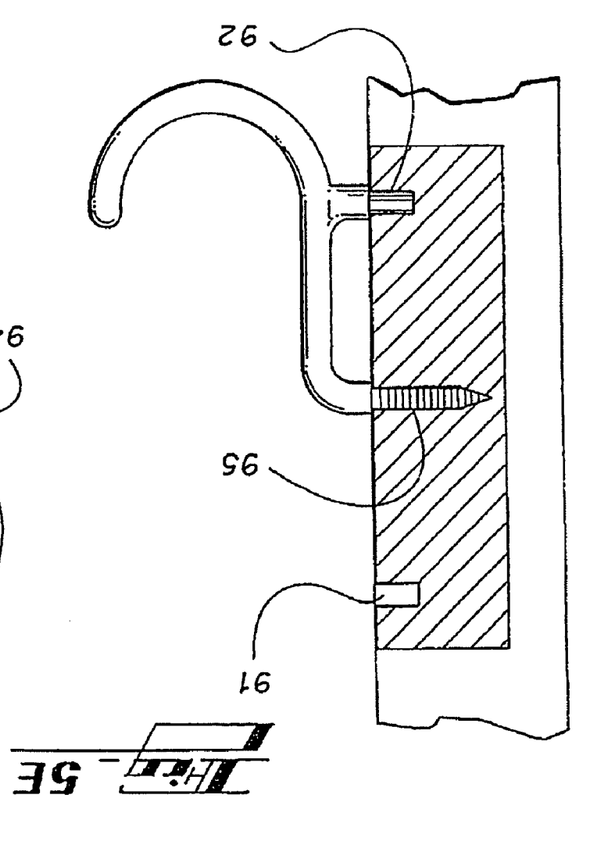
FIG. 5E is a side-view of a hook member, according to an alternate embodiment of the present invention, showing the hook installed through a cabinet wall.
Figure 5F:
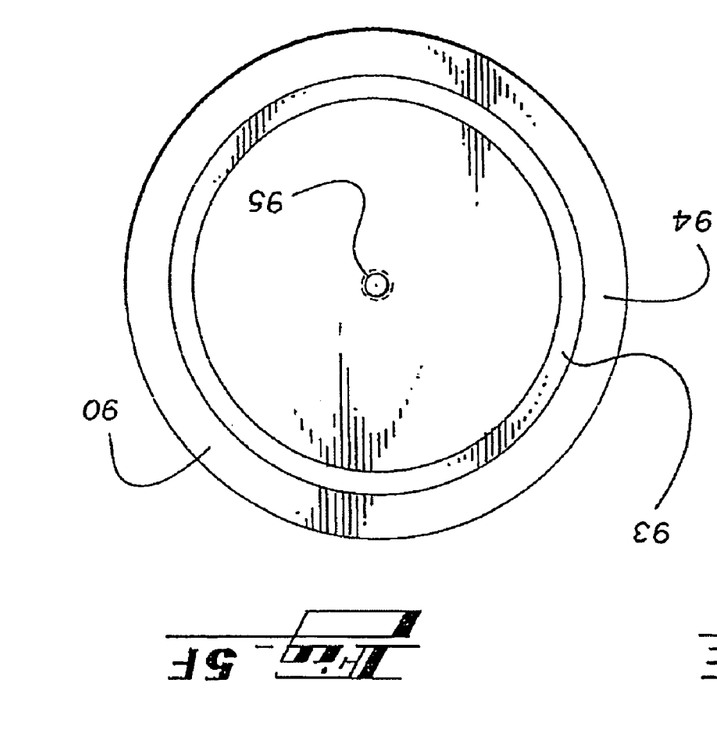
FIG. 5F is a front-view of the installation port of the hook member of FIG. 5E, according to an alternate embodiment of the present invention, showing the installation port without the hook installed.
Figure 6A:
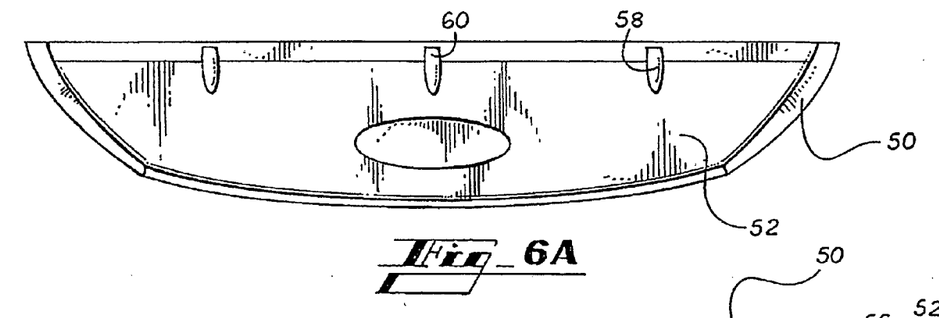
FIG. 6A is an overhead view of a document guard, according to the preferred embodiment of the present invention.
Figure 6B:
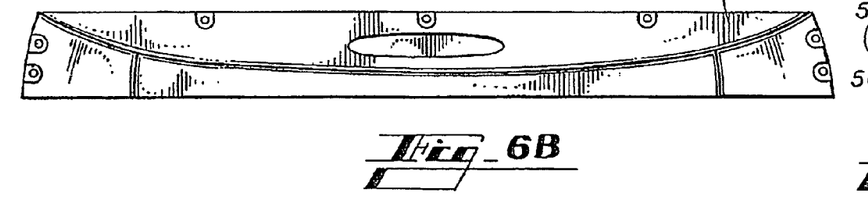
FIG. 6B is a front view of the document guard of FIG. 6A.
Figure 6C:
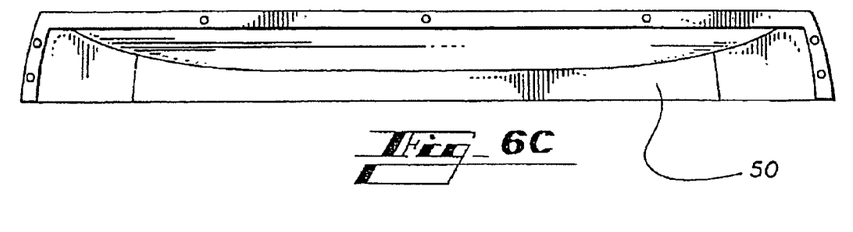
FIG. 6C is a rear view of the document guard of FIG. 6A.
Figure 6D:
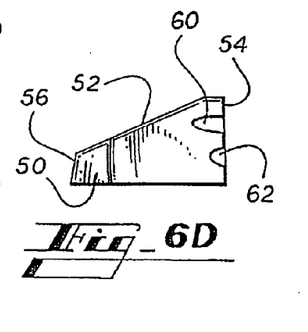
FIG. 6D is a side view of the document guard of FIG. 6A.
Figure 7A:
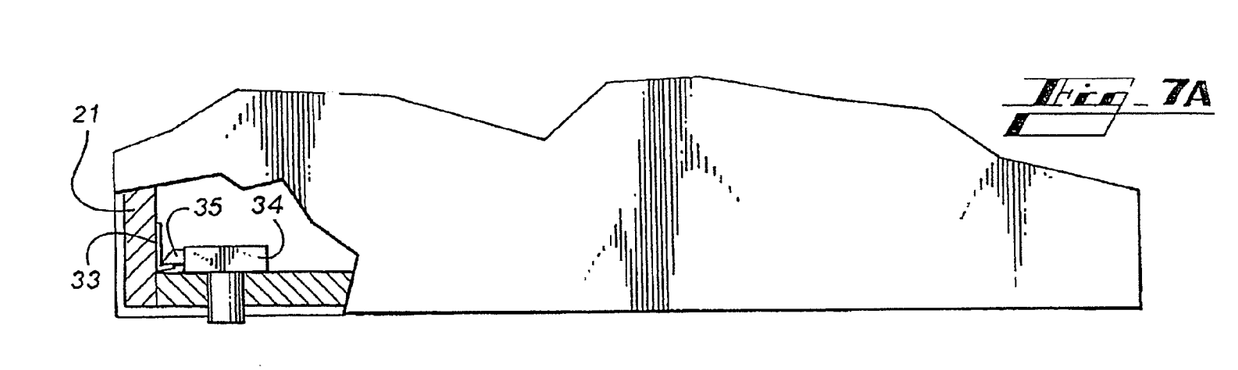
FIG. 7A is an overhead partial cutaway view of the paper collection cabinet of FIG. 1, showing the preferred lock configuration.
Figure 7B:
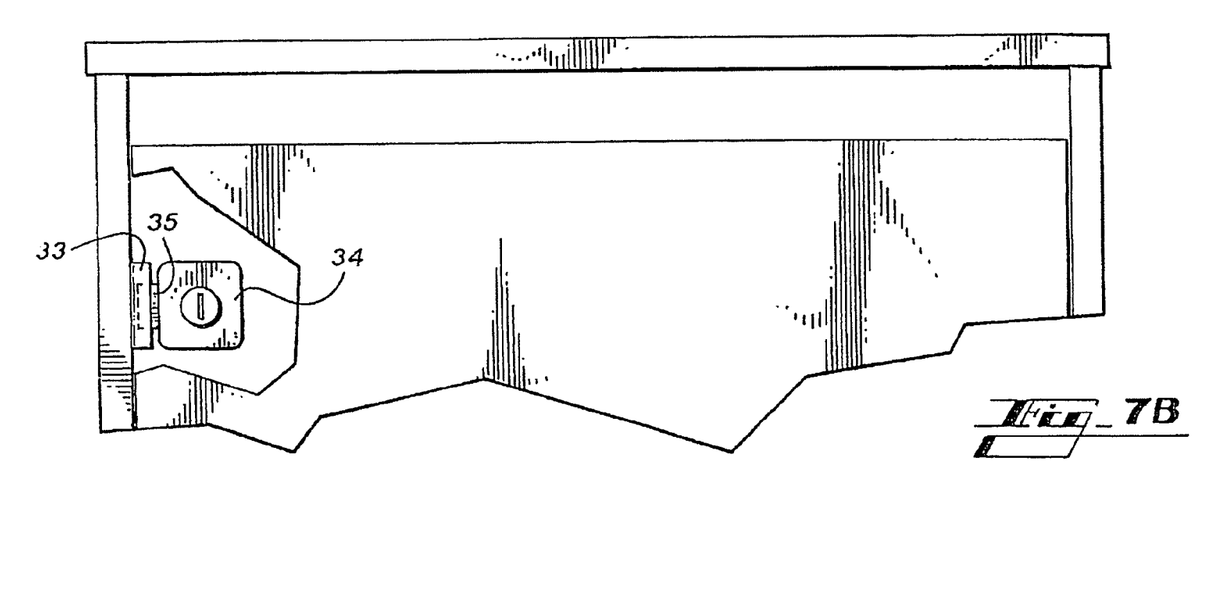
FIG. 7B is a front partial cutaway view of the paper collection cabinet of FIG. 1, showing the preferred lock configuration.

Referring now to FIGS. 5E-5F, plurality of collection bag hangers 70 could be retained within plurality of installation ports 90, wherein plurality of collection bag hangers 70, as depicted in FIG. 5C, wherein each attachment base 82 could extend from support arc 80 and could be supported by plurality of installation ports 90. Each installation port 90 could be defined within inner sidewalls 22a and 22b of cabinet housing 20, wherein plug 94 could be inserted therein. Plug 94 could be formed from plastic, metal, or other suitable material, and could define a general circular diameter with central receiving port 95 and ring support 93 defined therein. As each collection bag hanger 70 is screwed into cabinet housing 20 at central receiving port 95, attachment base 82 could rotate within ring support 93, wherein upper region 91 of ring support 93 facilitates passage of attachment base 82, and wherein lower region 92 of ring support 93 effectively defines receiving port 84 for final reception of attachment base 82 in a manner capable of providing easy installation and strengthened support for collection bag 100, via the extended diameter of plug 94, while avoiding failure of collection bag hangers 70. It is noted that a similar configuration could also be utilized without plug 94, wherein installation port 90 could receive a collection bag hanger 70 directly therein.

In the preferred configuration, receiving ports 84 are defined in sidewalls 22a and 22b of cabinet housing 20 in an angular fashion, wherein rear receiving ports 85a are defined closer to top edge 41 of cabinet housing 20 than front receiving ports 85b, thereby defining an angle therebetween that is opposing to the preferred downward angle defined by document guard 50. Secure mounting of plurality of collection bag hangers 70 within front and rear receiving ports 85b and 85a, respectively, thus enables collection bag 100 to be presented toward deposit way 40 for ease of filling. While such configuration and the benefits attendant thereto are recognized, it is recognized that collection bag 100 could be hung in an essentially level formation, or even opposingly angled, although collection of papers could be effected thereby.

In an alternate embodiment, paper collection system and device 10 could comprise an alternately configured collection bag support system, wherein generally horizontally-positioned support rails could be mounted along inner sidewalls 22a and 22b of cabinet housing 20, or troughs or elongated wells could be defined within inner sidewalls 22a and 22b to slidably retain and support the collection bag therein. For such an embodiment, the collection bag, proximate reinforced upper edge 106, could be adapted with a pair of opposingly positioned bracket-like members, with a male-type configuration, wherein the male bracket members could be sewn, glued, or otherwise supportively held by the collection bag in a manner capable of bearing the weight of a full load of discarded paper. The male bracket members could define an extending, sturdy arm member positioned essentially parallel with the upper edge of the collection bag, wherein the arm member could defines an "L" or "T" shaped cross-section, and each support rail or trough within the cabinet housing could define a female well with a compatible cross-section in order to enable slidable reception of the bag brackets and support thereof.

In another alternate embodiment, paper guard 50 could be formed with a plastic top section, and could be secured via plastic support brackets. Further, paper guard 50 could be formed with a plastic top, and could be secured with metal support brackets. Alternately, paper guard 50 could be formed with a plastic top, and wood support brackets or wedges could be utilized to secure paper guard 50 to front access panel 32.

In another alternate embodiment, paper guard 50 could be formed with a metal top section, and could be secured via plastic support brackets. Further, paper guard 50 could be formed with a metal top, and could be secured with metal support brackets Alternately, paper guard 50 could be formed with a metal top, and wood support brackets or wedges could be utilized to secure paper guard 50 to front access panel 32.

In yet another alternate embodiment, paper guard 50 could be formed with a wood top section, and could be secured via plastic support brackets. Further, paper guard 50 could be formed with a wood top, and could be secured with metal support brackets. Alternately, paper guard 50 could be formed with a wood top, and wood support brackets or wedges could be utilized to secure paper guard 50 to front access panel 32.

In still another alternate embodiment, paper collection system and device 10 could be constructed and utilized without document guard 50.

In another alternate embodiment, cabinet-style housing 20 could be alternately shaped, such as, for exemplary purposes only, cylindrical or trapezoidal, as could collection bag 100, and document guard 50 could be suitably arced.

In another alternate embodiment, hinged access to cabinet-style housing 20 could be provided via a sidewall or rearwall, in lieu of front access panel 32.

In still another alternate embodiment, hinged access to cabinet-style housing 20 could be provided via a lid, in lieu of, or in addition to, front access panel 32.

In another alternate embodiment, deposit way 40 could be adapted with an electronic feeding mechanism, with a mechanical roll-feed mechanism, or with a protective flap or hinged coverplate.

In yet another alternate embodiment, deposit way 40 could be defined in a sidewall, rearwall, or lid of cabinet-style housing 20, wherein if deposit way 40 is defined in the lid, document guard 50 could be formed in a manner to extend across a larger area, in order to block unauthorized reach-in access from above, yet to enable receipt of papers and/or documents into collection bag 100. Alternately, also, document guard 50 could be fastened to the lid.

In still another alternate embodiment, document guard 50 could be essentially flat, or rectangularly shaped, wherein an angular mounting could impart the angular upper surface for facilitating movement of papers, while still preventing unauthorized reach-in access.

In use, cabinet housing 20 is preferably assembled via cam-locks, with self-locking, hinged front access panel 30 in an open position. Collection bag 100 is preferably hung, via plurality of hanger ports 102, onto plurality of collection bag hangers 70 therewithin. Access panel 30 is closed, preferably automatically locking, and paper is received into collection bag 100 within secure cabinet housing 20. A key is preferably utilized to unlock and open door 30 of cabinet housing 20, wherein document guard 50 swings away from its position proximate collection bag 100, whereupon collection bag 100 is removed and the collected paper transported for shredding, incineration, recycling, or other desirable process. Once emptied, collection bag 100 is returned to cabinet housing 20 and door 30 is closed, automatically repositioning document guard 50 and reactivating the locking mechanism and securing the contents until the next collection.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A paper collection cabinet, comprising:
   a cabinet with a paper deposit aperture and a door having a self-locking mechanism; and
   an angular guard member disposed proximate said paper deposit aperture and on said door to prevent unauthorized reach-in access,
   wherein said paper deposit aperture is a rectangular-shaped opening proximate an upper edge of said door, wherein said angular guard is disposed adjacent and below said paper deposit aperture, and wherein said angular guard further comprises a downwardly-angled surface, extending inwardly into said cabinet, away from said door, and extending partially over a paper collection vessel which is removable from said cabinet via said door.

2. The paper collection cabinet of claim 1, wherein said paper collection vessel is a removable paper collection bag with a drawstring, and further comprising a plurality of collection bag hangers for supporting said paper collection bag within said cabinet.

3. The paper collection cabinet of claim 1, wherein said cabinet is rectangular shaped, with said door defining a hinged front access panel.

4. The paper collection cabinet of claim 3, wherein said front access panel is hinged via piano hinges.

5. The paper collection cabinet of claim 1, wherein said self-locking mechanism necessitates use of a key.

6. The paper collection cabinet of claim 1, wherein self-locking mechanism further comprises a lock configured to remain in a ready state after when said cabinet door is open, and wherein said lock automatically reactivates upon closure of said door.

7. The paper collection cabinet of claim 1, wherein said paper collection vessel is a reusable bag of an elongated parallelepiped shape, further comprising hanger ports, opposingly positioned in pairs, proximate an upper edge of said bag, and handles extending from a bag base.

8. The paper collection cabinet of claim 7, wherein a plurality of interior sidewalls of said cabinet include support hooks for engaging said hanger ports of said bag.

9. The paper collection cabinet of claim 8, wherein said support hooks are generally U-shaped, comprising an angled base, an outer extension arm, a rear support arm, and an attachment head.

10. The paper collection cabinet of claim 8, wherein said support hooks are generally S-shaped with a support arc.

11. The paper collection cabinet of claim 8, wherein said sidewalls of said cabinet are adapted with receiving ports, and wherein said receiving ports are angularly and downwardly defined relative to said a surface of said sidewall.

12. The paper collection cabinet of claim 1, wherein said paper collection vessel is a reusable bag of an elongated parallelepiped shape, further comprising male bracket members, wherein a plurality of troughs are disposed within said cabinet, and wherein said male bracket members are dimensioned for hanged, slidable support within said troughs.

13. The paper collection cabinet of claim 12, wherein said troughs are rails mounted to a plurality of interior surfaces of said cabinet.

14. The paper collection cabinet of claim 1, wherein said self-locking mechanism comprises said door having a spring bolt rim lock with a latchbolt, and said cabinet having a strikeplate, wherein said latchbolt engages said strikeplate.

15. A cabinet for secure collection of papers for shredding, comprising:
   a generally rectangular cabinet with a paper deposit aperture and an accessway;
   a flexible collection vessel removably positioned within said cabinet;
   a plurality of reinforced support components for positioning said flexible collection vessel within said cabinet;
   said accessway of said cabinet having a self-locking closure mechanism; and
   an access guard carried proximate said paper deposit aperture and on said accessway, wherein said access guard defines a generally triangular profile and a generally smooth upper surface, and preferably further comprises a plurality of attachmentways, disposed as upper edge fastening ports and side edge fastening ports.

\* \* \* \* \*